(12) United States Patent
Wang et al.

(10) Patent No.: US 12,523,508 B2
(45) Date of Patent: Jan. 13, 2026

(54) METHOD FOR DETERMINING FLOW MEASUREMENT VALUES OF A CORIOLIS MASS FLOWMETER IN THE PRESENCE OF A OF A TWO-PHASE FLOW

(71) Applicant: KROHNE AG, Basel (CH)

(72) Inventors: Tao Wang, Rough Common (GB); Xue Wang, Rough Common (GB); Yong Yan, Sevenoaks (GB); Jinyu Liu, Wellingborough (GB)

(*) Notice: Subject to any disclaimer, the term of this patent is extended or adjusted under 35 U.S.C. 154(b) by 0 days.

(21) Appl. No.: 17/337,993

(22) Filed: Jun. 3, 2021

(65) Prior Publication Data

US 2021/0381868 A1 Dec. 9, 2021

(30) Foreign Application Priority Data

Jun. 3, 2020 (DE) .................. 10 2020 114 713.9

(51) Int. Cl.
*G01F 1/84* (2006.01)
*G01N 9/00* (2006.01)

(52) U.S. Cl.
CPC .......... *G01F 1/8413* (2013.01); *G01F 1/8431* (2013.01); *G01F 1/8436* (2013.01); *G01N 2009/006* (2013.01)

(58) Field of Classification Search
CPC ..... G01F 1/8413; G01F 1/8431; G01F 1/8436
(Continued)

(56) References Cited

U.S. PATENT DOCUMENTS

| | | |
|---|---|---|
| 7,188,534 B2 | 3/2007 | Tombs et al. |
| 8,831,896 B2 | 9/2014 | Weinstein et al. |

(Continued)

FOREIGN PATENT DOCUMENTS

| | | |
|---|---|---|
| DE | 102006017676 B3 | 4/2006 |
| DE | 102018123534 A1 | 3/2020 |
| DE | 102018130182 A1 | 5/2020 |

OTHER PUBLICATIONS

Wang, L. et al. "Gas-Liquid Two-Phase Flow Measurement Using Coriolis Flowmeters Incorporating Artificial Neural Network, Support Vector Ma-chine, and Genetic Programming Algorithms" ; IEEE Transactions On In-strumentation And Measurement; vol. 66; No. 5; May 2017; pp. 18.
Yan, Y. et al. "Application of soft computing techniques to multiphase flow flow Measurement: A Revie" ; Elsevier; Feb. 13, 2018; pp. 14.
European Search Report; Application No. EP 21 17 7450; Completed: Oct. 21, 2021; 3 pages.

*Primary Examiner* — Peter J Macchiarolo
*Assistant Examiner* — Rodney T Frank
(74) *Attorney, Agent, or Firm* — Patrick D. Duplessis (57) ABSTRACT

A method is disclosed for determining flow measurement values of a Coriolis mass flowmeter in the presence of a two-phase flow of a two-phase medium having a gas phase and the subsequent presence of a single-phase flow of a single-phase medium not having a gas phase. The method includes: detecting a start time of a two-phase measurement interval at an onset of the two-phase flow; detecting an end time of the two-phase measurement interval at an end of the presence of the two-phase flow; determining and at least partially storing two-phase flow measurement values of the two-phase flow; determining at least one state variable of the single-phase medium; determining subsequently corrected two-phase flow measurement values as at least indirect input variables of a correction calculation; and outputting the corrected two-phase flow measurement values as individual values or as part of a cumulative flow measurement value.

19 Claims, 5 Drawing Sheets

(58) Field of Classification Search
USPC .................................................. 73/861.356
See application file for complete search history.

(56) References Cited

U.S. PATENT DOCUMENTS

| | | | |
|---|---|---|---|
| 10,473,512 B2 | 11/2019 | Zimmer et al. | |
| 2001/0045134 A1* | 11/2001 | Henry ....................... | G01F 1/74 |
| | | | 73/861.356 |
| 2005/0022611 A1 | 2/2005 | Hemp et al. | |
| 2005/0284237 A1* | 12/2005 | Henry ................... | G01F 1/8436 |
| | | | 73/861.356 |
| 2007/0119263 A1* | 5/2007 | Henry ....................... | G01F 1/74 |
| | | | 73/861.356 |
| 2008/0053240 A1 | 3/2008 | Henry et al. | |
| 2009/0019947 A1* | 1/2009 | Henry ....................... | G01F 1/74 |
| | | | 73/861.356 |
| 2018/0003538 A1* | 1/2018 | Schollenberger ..... | G01F 15/024 |
| 2019/0170552 A1 | 6/2019 | Dutton | |

* cited by examiner

METHOD FOR DETERMINING FLOW MEASUREMENT VALUES OF A CORIOLIS MASS FLOWMETER IN THE PRESENCE OF A OF A TWO-PHASE FLOW

TECHNICAL FIELD

The invention relates to a method for determining flow measurement values of a Coriolis mass flowmeter in the presence of a two-phase flow of a two-phase medium having a gas phase in a two-phase measurement interval and a subsequent presence of a single-phase flow of a single-phase medium not having gas phase in a single-phase measurement interval. Furthermore, the invention also relates to a Coriolis mass flowmeter having at least one measuring tube through which a medium can flow, at least one oscillation generator, at least two oscillation sensors and at least one control and evaluation unit, wherein the Coriolis mass flowmeter is designed to carry out the aforementioned method.

BACKGROUND

Coriolis mass flowmeters and methods for determining flow measurement values of a Coriolis mass flowmeter have been known for many decades in quite different designs. High measuring accuracy can be achieved with Coriolis mass flowmeters which, in the case of single-phase flow, is sometimes better than 0.1% of the measured value, so that Coriolis mass flowmeters can also be used, for example, in custody transfer applications. In the presence of a two-phase flow, the measuring accuracy can be massively negatively affected and then, for example, only amount to a few percent or even only a few tens of percent of the measured value. As a rule, the higher the gas volume fraction of the two-phase medium, the greater the impairment.

When the term two-phase flow is used here, it generally refers to a multi-phase flow that has a gaseous component. Thus, the term two-phase flow is based on the understanding that this flow has a gaseous phase and a non-gaseous phase, which in turn has liquid components, but may also have solid components. Thus, the term "two-phase flow" is also used here. Correspondingly, the term single-phase flow is based on the understanding that the single-phase medium has no gaseous phase in any case, but may contain liquid constituents and also solid constituents.

The occurrence of a two-phase flow is problematic as already explained because gas inclusions can strongly influence the measuring accuracy and also make the safe operation of a Coriolis mass flowmeter more difficult or even impossible. In the present case, the issue is the aspect of measurement accuracy; the aspect of maintaining reliable operation of a Coriolis mass flowmeter is described in a large number of applications filed by the patent applicant; an overview with various cross-references is provided, for example, in DE 10 2018 123 534 A1.

The problem of greatly reduced measurement accuracy in a two-phase flow compared to the presence of a single-phase flow is due to the measurement principle in Coriolis mass flowmeters being based on mechanical interaction with the flowing medium. Coriolis mass flowmeters belong to the class of oscillation flowmeters. Specifically, at least one measuring tube through which the medium to be measured flows is excited to oscillation by an oscillation generator. The oscillation generator is controlled by the control and evaluation unit, which is often implemented by an embedded computer system based on a microcontroller, in particular based on a digital signal processor. The mass-bearing medium reacts on the wall of the measuring tube due to the Coriolis inertial force caused by two orthogonal motions that of the flow and that of the measuring tube. This reaction of the medium on the measuring tube results in a change in the measuring tube velocity compared to the non-flowed oscillating state of the measuring tube. By capturing these features of the oscillations of the Coriolis measuring tube with flow (phase shift between inlet-side and outlet-side measuring tube oscillations) by the control and evaluation unit, the mass flow through the measuring tube can be detected with high accuracy.

Regardless of whether media are intentionally (e.g. in the food industry in the case of foamy whipped media) or unintentionally (often unavoidable due to the application, as in filling operations, e.g. in the refueling of ships, also known as "bunkering"), the measuring accuracy in a two-phase flow suffers under the circumstance that the entire mass of the flowing medium is no longer fully deflected by the oscillating measuring tube, but in some cases only experiences part of the deflection. This may be due, for example, to the fact that less dense components in the medium flow around denser components, which also applies to motion components orthogonal to the direction of flow, which are essential for Coriolis measurement. Compression or decompression of gaseous components in the medium, caused by the inertia of heavier liquid or solid medium components, can also be of importance.

In the prior art, various attempts have been made to improve the measurement accuracy of Coriolis mass flowmeters in two-phase flows. This has included the use of so-called soft computing methods, i.e., approximate solution methods using, for example, artificial neural networks and support vector machines (see, e.g., Wang, L. et al.: "Gas-Liquid Two-Phase Flow Measurement Using Coriolis Flowmeters Incorporating Artificial Neural Network, Support Vector Machine, and Genetic Programming Algorithms"; IEEE Transactions On Instrumentation And Measurement; Vol. 66; No. 5; May 2017). Although various improvements have been made, the treatment of two-phase flows remains problematic. This is especially true for those measurement operations that start with a two-phase flow and then change to a single-phase flow.

SUMMARY

Against this background, the object is thus to provide a method with which increased measurement accuracy can be achieved in Coriolis mass flowmeters when single-phase and also two-phase flows occur. The same applies to the design of the Coriolis mass flowmeter mentioned at the beginning.

The previously derived object is achieved in the method for determining flow measurement values of a Coriolis mass flowmeter in the presence of a two-phase flow of a two-phase medium having a gas phase in a two-phase measurement interval and a subsequent presence of a single-phase flow of a single-phase medium not having a gas phase in a single-phase measurement interval in that the start time of the two-phase measurement interval is detected at the onset of the two-phase flow and that the end time of the two-phase measurement interval is detected at the end of the presence of the two-phase flow. This initially ensures that there is clarity as to the period during which a two-phase flow is present or has been present at all.

In the two-phase measurement interval, two-phase flow measurement values of the two-phase flow are determined and at least partially stored. This means that the two-phase flow measurement values are also fundamentally available for subsequent examination and processing.

In the single-phase measurement interval, which follows the two-phase measurement interval, at least one state variable of the single-phase medium is determined. Subsequently corrected two-phase flow measurement values are determined from the stored two-phase flow measurement values and from the at least one state variable of the single-phase medium determined in the single-phase measurement interval as at least indirect input variables of a correction calculation.

The invention is thus based on the idea of subjecting the erroneous two-phase flow measurement values to a subsequent correction calculation, wherein at least one state variable of the single-phase medium is used for this correction calculation, which has been determined in the single-phase measurement interval occurring only after the two-phase measurement interval, and which can be determined there very precisely due to the presence of a single-phase flow that can be easily managed in terms of measurement. When it is said that the stored two-phase flow measurement values and the determined state variable of the single-phase medium (or also the several determined state variables of the single-phase medium) are used as at least indirect input variables of a correction calculation, then it is meant that, for example, the determined state variable does not have to enter directly into the correction calculation, but the state variable is first converted into another value and then fed to the correction calculation. This will be explained by means of an embodiment described later.

In any case, the idea is essentially that the end of the two-phase flow that is problematic in terms of measurement is awaited and the single-phase flow that then sets in is used to precisely detect state variables of the single-phase medium that are suitable for correcting the erroneous two-phase flow measurement values (at least much more precisely than would be possible in the two-phase measurement interval). The state variable of the single-phase medium used for the correction calculation must, of course, affect the two-phase flow in some way, so that the possibility for correction is given.

The corrected two-phase flow measurement values obtained in this way can then be output as individual values or output as part of a cumulative flow measurement value.

It goes without saying that in the single-phase measurement interval, not only is the state variable of the single-phase medium detected which is required for the correction calculation, but flow measurement values are usually also further detected.

According to an advantageous implementation of the method, it is provided that at least the density $\rho_{SP}$ of the single-phase medium is determined as state variable of the single-phase medium and is used as at least indirect input variable of the correction calculation. Examinations using various state variables of the single-phase medium have shown that the density $\rho_{SP}$ of the single-phase medium is particularly suitable for influencing the correction calculation in such a way that a measurement error in the two-phase measurement interval, which may well be in the range of several 10% of the measured value, can be reduced to the single-digit percentage range. For a typical refueling operation (two-phase measurement interval and single-phase measurement interval taken together) of a ship, for example, this means that measurement errors are now in the range of only 0.5% of the measured value, which is a considerable improvement over the state of the art.

In a preferred implementation of the method, the density $\rho_{SP}$ of the single-phase medium is used to calculate the (apparent) gas-volume fraction GVF of the two-phase medium, and the calculated gas-volume fraction GVF of the two-phase medium is used as a direct input variable to the correction calculation. Thus, this is an example where the state variable of the single-phase medium, in this case the density of the single-phase medium $\rho_{SP}$, is indirectly used as an input variable of the correction calculation. In particular, the (apparent) gas volume fraction GVF of the two-phase medium is calculated by taking the quotient of the difference between the density $\rho_{SP}$ of the single-phase medium and the density $\rho_{TP}$ of the two-phase medium and the density $\rho_{SP}$ of the single-phase medium. Since the density of the two-phase medium can only be detected with a certain inaccuracy, which is caused by the two-phase medium, we could also speak here of an apparent density $\rho_{TP}$ of the two-phase medium; when using it also only the apparent gas volume fraction GVF of the two-phase medium is detected. Nevertheless, in the following we will always speak of the gas-volume fraction GVF of the two-phase medium. Particularly preferably, the gas volume fraction GVF of the two-phase medium is calculated by forming the quotient of the difference between the density $\rho_{SP}$ of the single-phase medium and the density $\rho_{TP}$ of the two-phase medium and the difference between the density $\rho_{SP}$ of the single-phase medium and the density $\rho_G$ of the gas phase of the two-phase medium:

$$\text{GVF} = (\rho_{SP} - \rho_{TP}) / (\rho_{SP} - \rho_G).$$

A further development of this method is characterized in that the density $\rho_G$ of the gas phase of the two-phase medium is detected by measuring the temperature of the two-phase medium and measuring the pressure at the outlet of the Coriolis mass flowmeter. The density ρG of the gas phase of the two-phase medium is then detected based on the measured temperature of the two-phase medium and based on the measured pressure at the outflow side of the Coriolis mass flowmeter. This has the advantage that the density $\rho_G$ of the gas phase of the two-phase medium does not have to be specified entirely as a parameter, but is determined based on the specific operating conditions of the Coriolis mass flowmeter. The fact that both pressure and temperature are essential for detecting the density of a gas follows from the thermal equation of state of ideal gases, which can also be applied approximately to real gases. It can also be helpful if information about the material composition of the gas phase is available, which is often the case, for example, in the previously mentioned example of use in the refueling of ships.

In a further development of the method described above, it is provided that the viscosity $\mu_{SP}$ of the single-phase medium is used as a further input variable of the correction calculation, in particular wherein the viscosity $\mu_{SP}$ of the single-phase medium is determined from a temperature-dependent viscosity curve using the temperature of the two-phase medium. Temperature-dependent viscosity curves can be recorded, for example, under laboratory conditions for different media and stored in the respective Coriolis mass flowmeter.

In a further preferred implementation of the method, it is provided that the differential pressure $P_D$ across the inflow side and the outflow side of the Coriolis mass flowmeter is used as a further input variable of the correction calculation, in particular wherein the differential pressures $P_D$ determined in the two-phase measurement interval are at least partially stored, and particularly preferably a differential pressure $P_D$ is also stored for each stored two-phase flow measurement value. The differential pressure can be captured very easily, for example, by means of a differential pressure sensor.

There are quite different ways to determine the aforementioned correction calculation in its essence and also to store it in a Coriolis mass flowmeter as an algorithm. If the exact functional relationship between the input variables and the desired output variable, i.e., the corrected two-phase flow measurement value, is not known, i.e., the relationship cannot be mapped analytically or numerically without further ado by means of exact calculation methods, it has proved advantageous to use an approximate solution method. Solution methods of this class are technically referred to as soft computing.

A further development of the method is therefore characterized in that the correction calculation is implemented with an approximate solution method, in which the input variables of the correction calculation, i.e., at least the stored two-phase flow measurement values and the at least one state variable of the single-phase medium determined in the single-phase measurement interval as at least indirect input variables, are mapped approximately to the corrected two-phase flow measurement values. Preferably, the approximate solution method is implemented by an artificial neural network or by a support vector machine.

It has been found to be particularly suitable that the correction calculation is implemented by an artificial neural network with an input layer with at least two input neurons for supply of the stored two-phase flow measurement values to be corrected and for supply of the state variable of the single-phase medium determined in the single-phase measurement interval or a variable derived therefrom as at least indirect input variables, with an output layer with an output neuron for output of the subsequently corrected two-phase flow measurement values, and with at least one intermediate layer with at least two neurons. The artificial neural network is preferably implemented as a fully interconnected network, wherein each input neuron is connected to each neuron of the intermediate layer via directed and weighted signal paths, and wherein each neuron of the intermediate layer is connected to the output neuron of the output layer via a directed and weighted signal path. The intermediate layer neurons sum the input values arriving via the weighted signal paths and evaluate them via an activation function. The neurons of the intermediate layer are further applied with an offset value.

In a preferred variation of the method, the artificial neural network has at least four input neurons in the input layer for supply of the stored two-phase flow measurement values to be corrected, the gas volume fraction GVF of the two-phase medium, the viscosity $\mu_{SP}$ of the single-phase medium, and the differential pressure $P_D$ across the inflow side and the outflow side of the Coriolis mass flowmeter. Further, the artificial neural network has an output neuron for output of the subsequently corrected two-phase flow measurement values, and four neurons in an intermediate layer, wherein each input neuron is connected to each neuron of the intermediate layer via directed and weighted signal paths, and wherein each neuron of the intermediate layer is connected to the output neuron of the output layer via a directed and weighted signal path and is applied with an offset value.

When implementing the correction calculation as an artificial neural network, it is further provided that the artificial neural network is trained with a training data set, wherein the training data set is collected for one design of a Coriolis mass flowmeter and the training data set comprises value tuples from the used input variables of the artificial neural network and the output variable of the artificial neural network. Such a training data set is collected, for example, under laboratory conditions. Preferably, the flow is thereby varied over at least 80% of the measurement range, in particular wherein the gas volume fraction GVF of the two-phase medium is varied at least in the range between 0% and 60%.

Preferably, a training data set is collected for each particular two-phase medium and a separate artificial neural network is trained for each two-phase medium. From the different trained artificial neural networks, data sets are then obtained that contain the weights of the different signal paths and also the offset values of the neurons of the intermediate layer. This then allows a structurally similar implemented artificial neural network to be parameterized for each two-phase medium.

All previously described variations of the method according to the invention can be carried out online. The start time of the two-phase measurement interval is then determined in real time, the subsequent two-phase flow measurement values are stored until the end of the two-phase measurement interval is detected. The correction calculation can then be initiated and corrected flow measurement values (individually or as a cumulative measurement result) can be output. However, it is also possible to proceed in such a way that during a measurement operation, for example during a filling operation, all flow measurement values are stored, that after the completed measurement operation, the single-phase measurement interval and the two-phase measurement interval are determined from the stored flow measurement values or other recorded data, and that the correction calculation is then carried out.

The described object is also achieved in the case of the Coriolis mass flowmeter mentioned at the beginning in that it is prepared in such a way that it can carry out the described method. This means that the control and evaluation unit is designed such that, in the presence of a two-phase flow of a two-phase medium having a gas phase in a two-phase measurement interval and a subsequent presence of a single-phase flow of a single-phase medium not having a gas phase in a single-phase measurement interval, the start time of the two-phase measurement interval is determined at the onset of the two-phase flow, that the end time of the two-phase measurement interval is determined at the end of the presence of the two-phase flow, that the two-phase flow measurement values of the two-phase flow determined in the two-phase measurement interval are stored at least partially, that at least one state variable of the single-phase medium is determined in the single-phase measurement interval, that, from the stored two-phase flow measurement values and from the at least one state variable of the single-phase medium determined in the single-phase measurement interval, subsequently corrected two-phase flow measurement values are determined as at least indirect input variables of a correction calculation, and that the corrected two-phase flow measurement values are output as individual values or are output as part of a cumulative flow measurement value. Preferably, the control and evaluation unit is designed such that it also implements all the preferred implementations and variations of the method described above in the operation of the Coriolis mass flowmeter.

Various possibilities are known from the prior art as to how the detection of a two-phase flow can proceed. DE 10 2006 017 676 A1 is mentioned here as an example for the pure detection of a two-phase flow, whereby various state variables and changes in these state variables are evaluated in part statistically to obtain a two-phase signal that indicates the presence or absence of a two-phase flow with a high degree of accuracy.

In the implementation of the Coriolis mass flowmeter described here, it is preferably provided that the start time of the two-phase measurement interval at the onset of the two-phase flow and/or that the end time of the two-phase measurement interval at the end of the presence of the two-phase flow is detected by evaluating the level of the excitation signal of the oscillation generator and/or by evaluating the level of the sensor signal of the oscillation sensor. In particular, the start time of the two-phase measurement interval is determined when a limit height of the excitation signal and/or the sensor signal is exceeded, and in particular, the end time of the two-phase measurement interval is determined when the excitation signal and/or the sensor signal falls below a limit height. Other quantities can also be used as indicators for the presence of a two-phase flow, such as the standard deviation of the mass flow (small for single-phase flow, significantly larger for two-phase flow), the sound emission at the measurement location (small for single-phase flow, larger for two-phase flow), oscillations at the measuring device or connected lines (small for single-phase flow, significantly larger for two-phase flow).

BRIEF DESCRIPTION OF THE DRAWINGS

In detail, there are now a multitude of possibilities for designing and further developing the method according to the invention and the Coriolis mass flowmeter according to the invention. For this, reference is made to the following description of embodiments in connection with the drawings.

DETAILED DESCRIPTION

Figure 2:
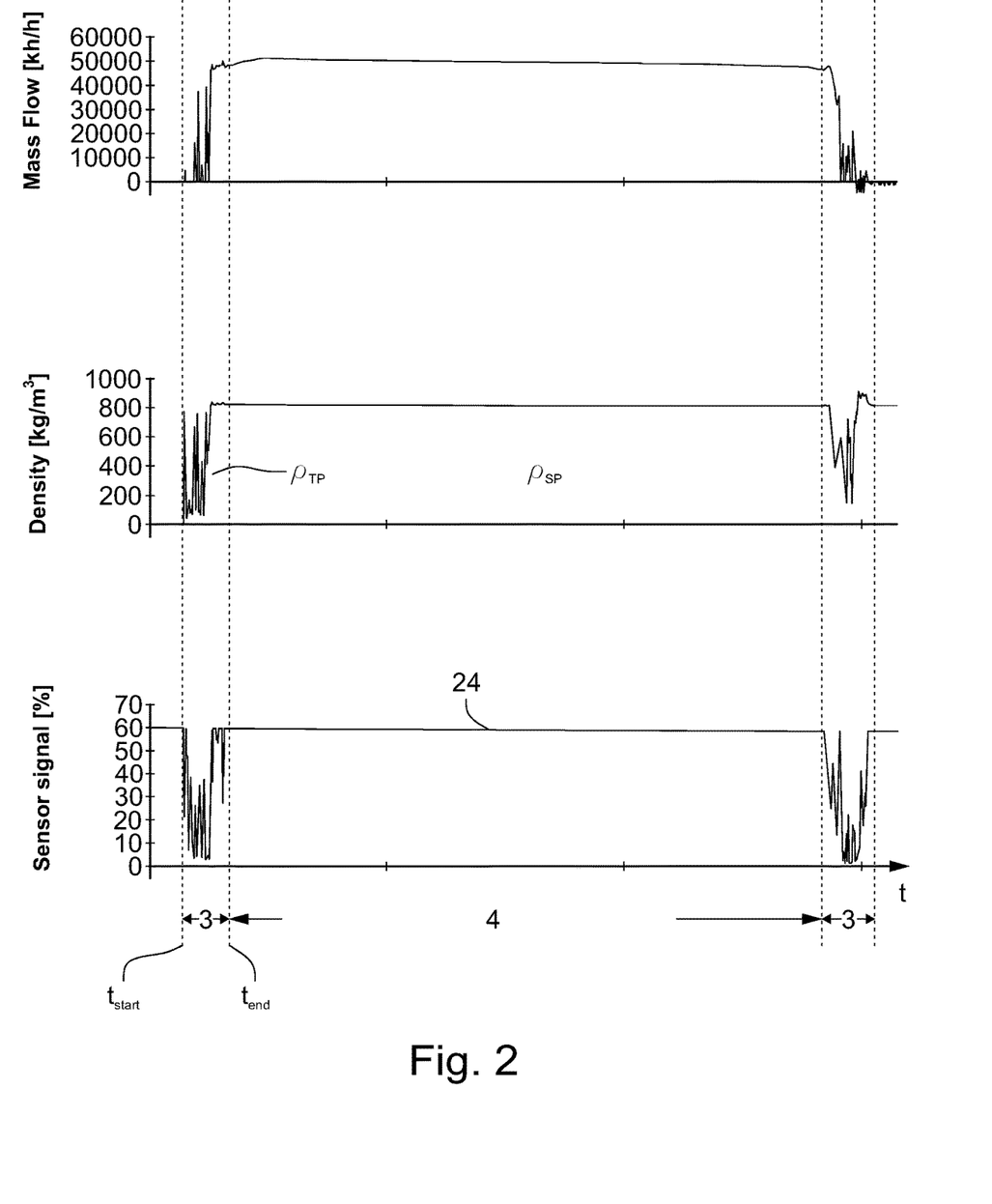
FIG. 2 illustrates the time course of various relevant physical variables during a typical refueling operation of a ship with two-phase flow and subsequent single-phase flow.

In all figures, a method 1 for determining flow measurement values of a Coriolis mass flowmeter 2 in whole or in part is shown. FIG. 2 schematically shows a Coriolis mass flowmeter 2 in which the method 1 for determining flow measurement values described below is implemented.

All the embodiments shown have in common that they are concerned with determining flow measurement values of a Coriolis mass flowmeter 2 in the presence of a two-phase flow of a two-phase medium having a gas phase in a two-phase measurement interval 3 and a subsequent presence of a single-phase flow of a single-phase medium not having a gas phase in a single-phase measurement interval 4.

Figure 1:
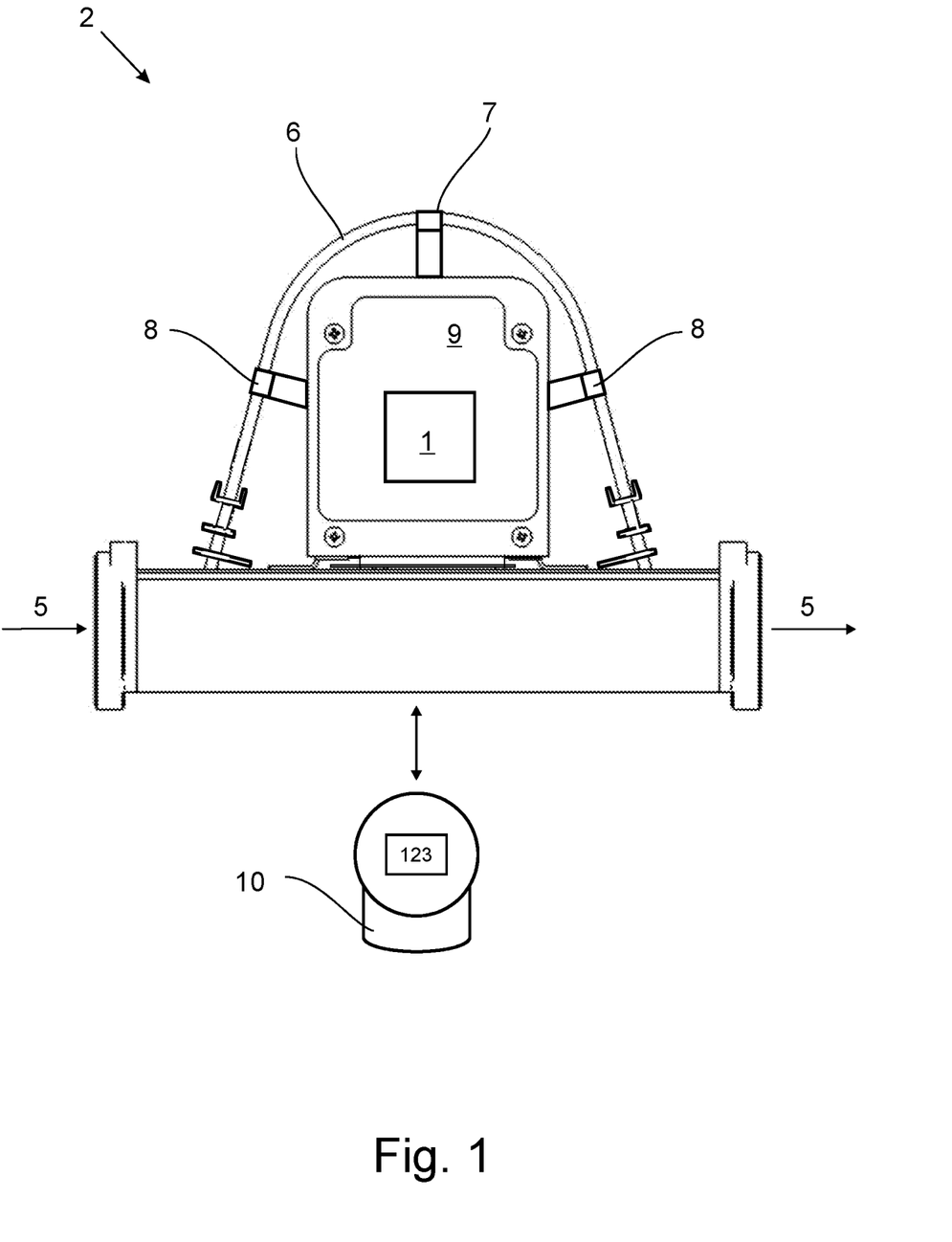
FIG. 1 schematically illustrates the design of a Coriolis mass flowmeter.

FIG. 1 schematically shows a Coriolis mass flowmeter 2 with a measuring tube 6 through which a medium 5 (indicated by the arrows running horizontally from left to right) can flow, an oscillation generator 7, two oscillation sensors 8 and a control and evaluation unit 9. Flow measurement values can be displayed here on the display unit 10. The Coriolis mass flowmeter 2 shown here as an example has a measuring tube 6 bent into a V-shape. The Coriolis mass flowmeter 2 can just as easily be designed in any other shape, for example with straight measuring tubes, with U-shaped or omega-shaped measuring tubes, etc.; the chosen design of a Coriolis mass flowmeter is not important. The control and evaluation unit 9 is based on a small computer with a digital signal processor and with I/O interfaces via which the oscillation generator 7 can be controlled and via which the sensor signals 24 of the oscillation sensors 8 can be captured by means of measurement. With suitable programming of the control and evaluation unit 9, the method 1 described here for determining flow measurement values is implemented in the Coriolis mass flowmeter 2.

On the basis of the time curves of mass flow rate, density of the medium and the sensor signal 24 of an oscillation sensor, FIG. 2 shows the typical course of a filling operation using the example of the refueling of a ship, in which both a two-phase flow and a subsequent single-phase flow are present. At the very beginning of the filling operation, the fuel is mixed with a gas phase, so that a two-phase flow is present in the two-phase measurement interval 3. The gas content in the two-phase medium varies greatly here, and the flow measurement values and the determined density $\rho_{TP}$ of the two-phase medium also vary accordingly. The amplitude of the sensor signal 24 of one of the oscillation sensors 8 is also subject to strong fluctuations, which is characteristic of a two-phase flow.

The range of two-phase flow in the two-phase measurement interval 3 is problematic in terms of measurement, the achievable measurement accuracy is frequently worse by one or even two powers of ten than the measurement accuracy in the range of single-phase flow in the single-phase measurement interval 4.

The method 1 according to the invention is based on the idea of initially storing the inaccurate two-phase flow measurement values $q_{TP, meas}$ and later supplying them to a correction calculation in the knowledge of state variables $x_{SP}$ of the single-phase medium determined with high accuracy in the single-phase measurement interval 4.

Figure 3:
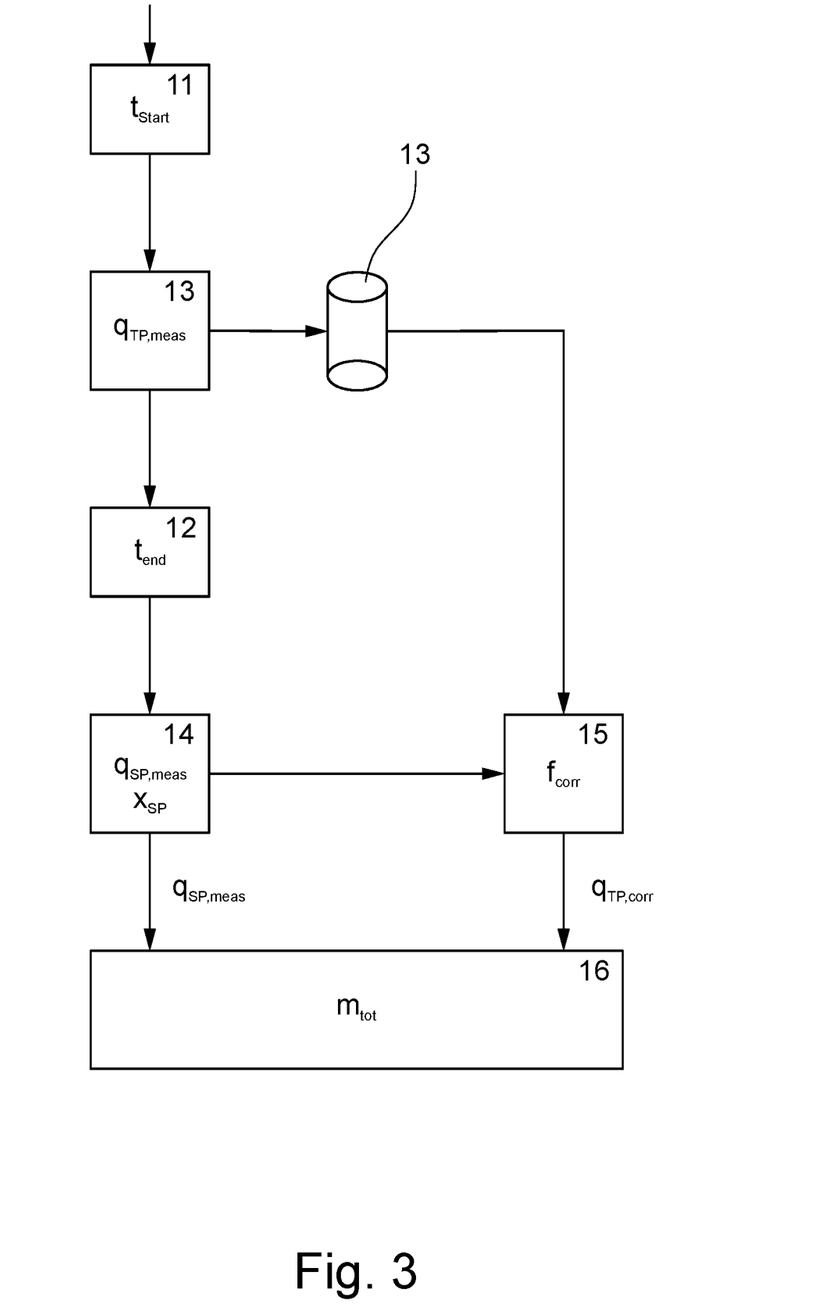
FIG. 3 schematically illustrates a method for determining corrected flow measurement values of a Coriolis mass flowmeter.

FIG. 3 shows an example of an implementation of method 1 by means of a flow chart. The start time $t_{start}$ of the two-phase measurement interval 3 is determined at the onset of the two-phase flow 11, and the end time $t_{end}$ of the two-phase measurement interval 3 is determined at the end of the presence of the two-phase flow 12. In the two-phase measurement interval 3, two-phase flow measurement values $q_{TP, meas}$ of the two-phase flow are determined and at least partially stored 13. Furthermore, in the single-phase measurement interval 4, at least one state variable $x_{SP}$ of the single-phase medium is determined 14. From the stored two-phase flow measurement values $q_{TP, meas}$ and from the state variable $x_{SP}$ of the single-phase medium determined in the single-phase measurement interval 4, subsequently corrected two-phase flow measurement values $q_{TP, corr}$ are then determined 15 as at least indirect input variables of a correction calculation $f_{corr}$. In this embodiment, the corrected two-phase flow measurement values $q_{TP,\ corr}$ are output 16 as part of a cumulative flow measurement value $m_{tot}$.

Of course, the question arises which specific state variable $x_{SP}$ of the single-phase medium is suitable to be used meaningfully as at least indirect input variable of a correction calculation $f_{corr}$; for this, the actually present two-phase flow measurement values must be dependent on the state variable. In the embodiments shown here, the density $\rho_{SP}$ of the single-phase medium is determined as the state variable of the single-phase medium—at least also—and used as at least indirect input variable of the correction calculation $f_{corr}$. The density $\rho_{SP}$ of the single-phase medium can be detected with a Coriolis mass flowmeter, since the density of the medium 5 flowing in the measuring tubes 6 affects the natural angular frequency of the excited oscillation mode of the measuring tube 6 (or several measuring tubes 6).

Figure 4:
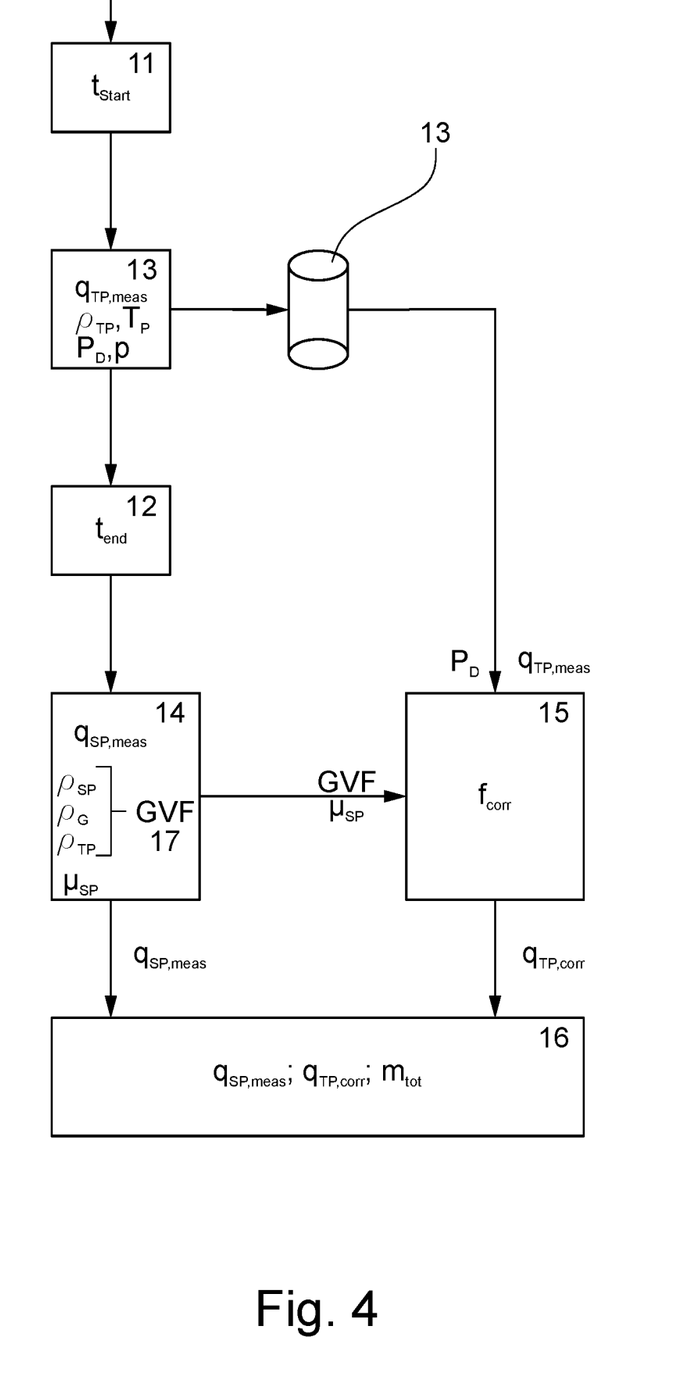
FIG. 4 schematically illustrates another embodiment of a method for determining corrected flow measurement values of a Coriolis mass flowmeter.

As is indicated in FIG. 4, the density $\rho_{SP}$ of the single-phase medium is used to calculate 17 the gas-volume fraction GVF of the two-phase medium and the calculated gas-volume fraction GVF of the two-phase medium is used as a direct input to the correction calculation f corr, wherein the gas volume fraction GVF of the two-phase medium is calculated by forming the quotient of the difference between the density $\rho_{SP}$ of the single-phase medium and the density $\rho_{TP}$ of the two-phase medium and the difference between the density $\rho_{SP}$ of the single-phase medium and the density $\rho_G$ of the gas phase of the two-phase medium. For example, the density $\rho_{TP}$ of the two-phase medium can be detected in the same way as the density $\rho_{SP}$ of the single-phase medium.

In the method 1 shown in FIG. 4, the density $\rho_G$ of the gas phase of the two-phase medium is detected by measuring the temperature $T_{TP}$ of the two-phase medium and measuring the pressure p at the outlet of the Coriolis mass flowmeter 2, and the density $\rho_G$ of the gas phase of the two-phase medium is detected based on the measured temperature $T_{TP}$ of the two-phase medium and based on the measured pressure p at the outflow side of the Coriolis mass flowmeter.

As can also be seen in FIG. 4, the viscosity $\rho_{SP}$ of the single-phase medium is used as another input variable for the correction calculation $f_{corr}$. The viscosity $\rho_{SP}$ of the single-phase medium is determined from a temperature-dependent viscosity curve using the temperature $T_{TP}$ of the two-phase medium; the temperature-dependent viscosity curve is not shown separately here.

Furthermore, in the method 1 according to FIG. 4, the differential pressure $P_D$ over the inflow side and the outflow side of the Coriolis mass flowmeter 2 is used as a further input variable of the correction calculation $f_{corr}$, wherein the differential pressures $P_D$ determined in the two-phase measurement interval 3 are also stored 13 at least in part. Presently, a differential pressure $P_D$ is also stored for each stored two-phase flow measurement value $q_{TP,\ meas}$.

For the illustrated embodiments for method 1, it holds true that the correction calculation $f_{corr}$ is implemented with an approximate solution method in which the input variables of the correction calculation $f_{corr}$, i.e., at least the stored two-phase flow measurement values $q_{TP}$ and the at least one state variable $x_{SP}$ of the single-phase medium determined in the single-phase measurement interval 4 as at least indirect input variables (FIG. 3), are mapped approximately to the corrected two-phase flow measurement values $q_{TP,\ corr}$. These approximate solution methods are all implemented here by an artificial neural network 18, which is shown in more detail in FIGS. 5 and 6.

Figure 5:
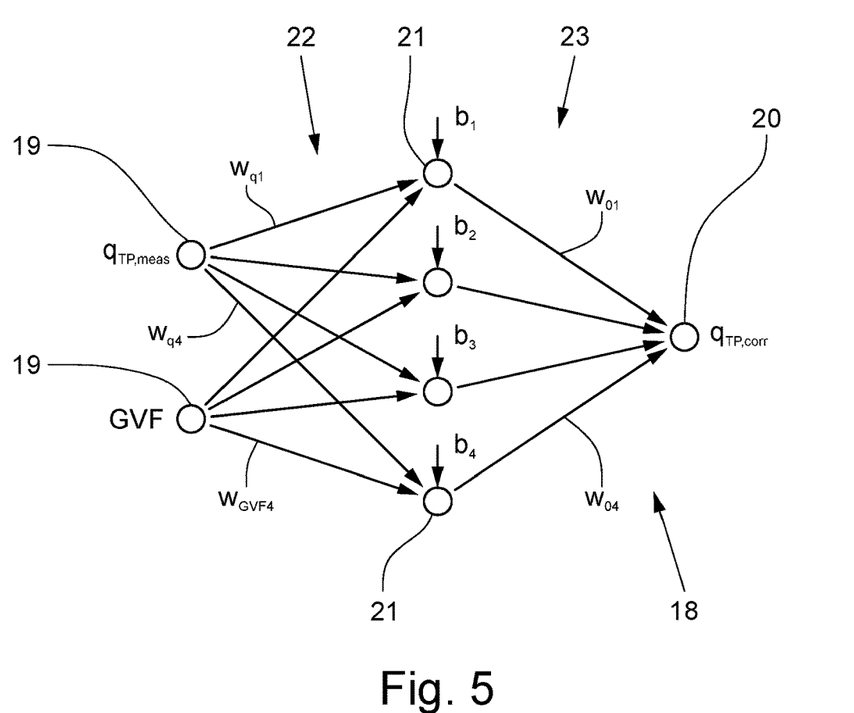
FIG. 5 illustrates an embodiment for the implementation of a correction calculation within the method of interest here with the aid of an artificial neural network.

FIG. 5 shows that the correction calculation $f_{corr}$ is implemented by an artificial neural network 18 having an input layer with two input neurons 19 for supply of the stored two-phase flow measurement values $q_{TP}$ to be corrected and for supply of the state variable $x_{SP}$ of the single-phase medium (density $\rho_{SP}$ of the single-phase medium) determined in the single-phase measurement interval 4. In fact, it is not the density $\rho_{SP}$ of the single-phase medium that is supplied, but the gas volume fraction GVR as a quantity derived from the density $\rho_{SP}$ of the single-phase medium. Furthermore, an output layer with an output neuron 20 for output of the subsequently corrected two-phase flow measurement values $q_{TP,\ corr}$ is provided, and an intermediate layer with four neurons 21. Each input neuron 19 is connected to each neuron 21 of the intermediate layer via directed and weighted signal paths 22, and each neuron 21 of the intermediate layer is connected to the output neuron 20 of the output layer via a directed and weighted signal path 23. An offset value $b_i$ is applied to each neuron 21 of the intermediate layer. The weights of the signal paths are denoted by w, although not all weights of all signal paths 22 have been drawn for clarity.

Figure 6:
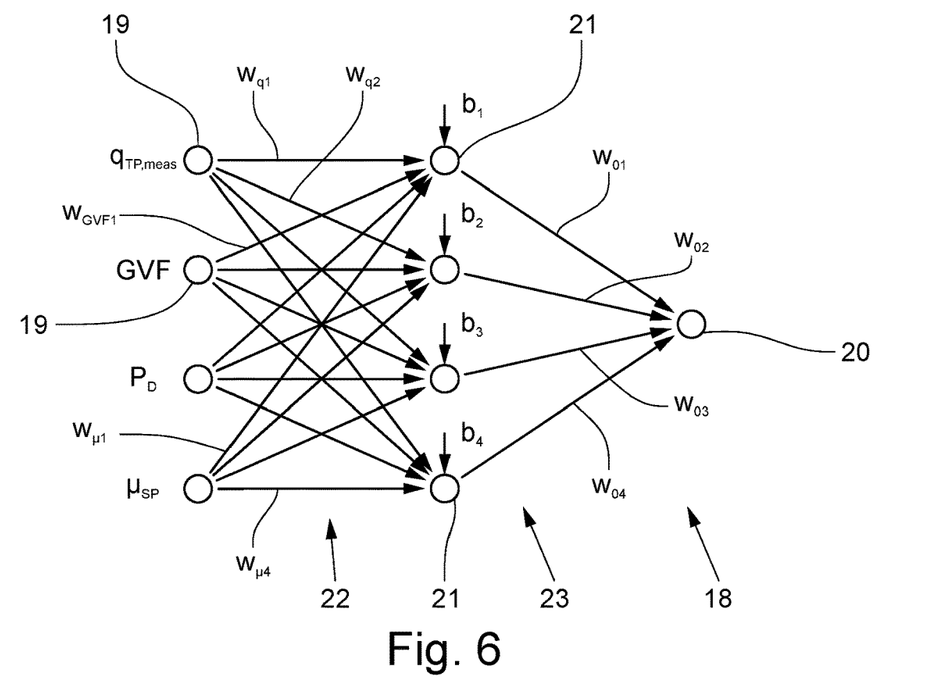
FIG. 6 illustrates a further embodiment for the implementation of a correction calculation within the method of interest here with the aid of an extended artificial neural network.

The embodiment according to FIG. 6 is characterized in that the artificial neural network 18 has four input neurons 19 in the input layer for supply of the stored two-phase flow measurement values $q_{TP,\ meas}$, the gas volume fraction GVF of the two-phase medium, the viscosity $\mu_{SP}$ of the single-phase medium and the differential pressure $P_D$ to be corrected via the inflow side and the outflow side of the Coriolis mass flowmeter 2. As in the previous embodiment, the artificial neural network 18 has an output neuron 20 for output of the subsequently corrected two-phase flow measurement values $q_{TP,\ corr}$ and four neurons 21 in an intermediate layer, wherein each input neuron 19 is connected to each neuron 21 of the intermediate layer via directed and weighted signal paths 22, and wherein each neuron 21 of the intermediate layer is connected to the output neuron 20 of the output layer via a directed and weighted signal path 23, and in particular each neuron 21 of the intermediate layer is supplied with an offset value $b_i$. As in FIG. 5, not all weighting w of the signal paths 22, 23 have been drawn here.

The artificial neural networks 18 according to FIGS. 5 and 6 are trained with a training data set in order to be operational, wherein the training data set is collected for one design of a Coriolis mass flowmeter 2. In the present case, this has been done under laboratory conditions. The training data set comprises value tuples from the used input variables of the artificial neural networks 18 and the output variable of the artificial neural network 18, i.e., the—preferably error-free—value for the flow. In the example shown here, the flow has been varied over about 80% of the measurement range to create the training data set, and in addition, the gas volume fraction GVF of the two-phase medium has been varied in the range between about 0% and 60%.

The training of the artificial neural networks 18 according to FIGS. 5 and 6 is done in an iterative optimization process. The artificial neural network 18 is repeatedly supplied with the input data of the associated value tuples, and in each case a value results at the output of the artificial neural network 18 for the corrected two-phase flow measurement value $q_{TP,\ corr}$. This value is compared to the two-phase flow measurement value contained in the value tuple of the training data set. Ideally, the value calculated by the artificial neural network 18 is as close as possible to (or as similar as possible to) the exact value from the corresponding value tuple of the training data set. When training the network, the deviation of both values from each other (difference, amount of difference, square of error, etc.) is then minimized by suitably changing the weighting $w_i$ of the signal paths and also the offset values $b_i$ of the neural nodes 21 of the intermediate layer (e.g., gradient descent method). The suitability of the resulting artificial neural network 18 is tested with a portion of the training data set which was not used during the training of the artificial neural network 18. If the deviation of the corrected two-phase flow measurement values of the artificial neural network 18 from the exact results of the training data set is below a tolerable threshold, the training is terminated and the trained artificial neural network 18 then approximately implements the correction calculation $f_{corr}$.

A variation of method 1, not shown separately in the figures, is that during a measurement operation, for example during a filling operation, all flow measurement values $q_{TP}$, $q_{SP}$ are stored, i.e., those of the two-phase flow as well as those of the single-phase flow. After the measurement operation is completed, the single-phase measurement interval 4 and the two-phase measurement interval 3 are determined from the stored flow measurement values or other recorded data, then the correction calculation $f_{corr}$ is performed.

As described above, the method 1 is implemented in the Coriolis mass flowmeter 2 in that the control and evaluation unit 9 is designed such that, when there is a two-phase flow of a two-phase medium having gas phase in a two-phase measuring interval 3 and a subsequent presence of a single-phase flow of a single-phase medium not having a gas phase in a single-phase measuring interval 4, the start time $t_{start}$ of the two-phase measurement interval 3 is detected at the onset of the two-phase flow, that the end time $t_{end}$ of the two-phase measurement interval 3 is detected at the end of the presence of the two-phase flow, that in the two-phase measurement interval (3) two-phase flow measurement values $q_{TP, meas}$ of the two-phase flow are determined and at least partially stored 13, that in the single-phase measurement interval 4 at least one state variable $x_{SP}$ of the single-phase medium is determined 14, that, from the stored two-phase flow measurement values $q_{TP, meas}$ and from the at least one state variable $x_{SP}$ of the single-phase medium determined in the single-phase measurement interval 4, subsequently corrected two-phase flow measurement values $q_{TP, corr}$ are determined 15 as at least indirect input variables of a correction calculation $f_{corr}$, and that the corrected two-phase flow measurement values $q_{TP, corr}$ are output as individual values or are output 16 as part of a cumulative flow measurement value $m_{tot}$.

In FIG. 1, the control and evaluation unit 9 is configured in such a way that the Coriolis mass flowmeter 2 is capable of carrying out the previously described embodiments of the method 1.

In particular, the Coriolis mass flowmeter shown in FIG. 1 is designed such that the start time $t_{start}$ of the two-phase measurement interval 3 is detected at the onset of the two-phase flow and also the end time $t_{end}$ of the two-phase measurement interval 3 is detected at the end of the presence of the two-phase flow by evaluating the level of the sensor signal 24 of the oscillation sensor 8. Here, the start time $t_{start}$ of the two-phase measurement interval 3 is determined when a limit height of the sensor signal 24 is exceeded, and the end time $t_{end}$ of the two-phase measurement interval 3 is determined when the sensor signal 2 falls below a limit height, for which reference is made to FIG. 2.

The invention claimed is:

1. A method for determining flow measurement values of a Coriolis mass flowmeter in the presence of a two-phase flow of a two-phase medium having a gas phase in a two-phase measurement interval and a presence of a single-phase flow of a single-phase medium not having a gas phase in a single-phase measurement interval occurring after the two-phase measurement interval, comprising:
   detecting the start time of the two-phase measurement interval at the onset of the two-phase flow;
   detecting the end time of the two-phase measurement interval at the end of the presence of the two-phase flow;
   in the two-phase measurement interval, determining and storing two-phase flow measurement values of the two-phase flow;
   in the single-phase measurement interval occurring after the two-phase measurement interval, determining at least one state variable of the single-phase medium;
   inputting the two-phase flow measurement values determined and stored in the two-phase measurement interval and the at least one state variable of the single-phase medium determined in the single-phase measurement interval as variables of a correction calculation; and
   outputting corrected two-phase flow measurement values from the correction calculation.

2. The method according to claim 1, further comprising:
   determining at least the density of the single-phase medium as state variable of the single-phase medium; and
   using at least the density of the single-phase medium as at least an indirect input variable of the correction calculation.

3. The method according to claim 2, further comprising:
   calculating the gas-volume fraction of the two-phase medium using the density of the single-phase medium; and
   using the calculated gas-volume fraction of the two-phase medium as a direct input variable of the correction calculation;
   wherein the gas volume fraction of the two-phase medium is calculated by forming the quotient of the difference between the density of the single-phase medium and the density of the two-phase medium and the density of the single-phase medium; and
   wherein the quotient is formed from the difference between the density of the single-phase medium and the density of the two-phase medium and the difference between the density of the single-phase medium and the density of the gas phase of the two-phase medium.

4. The method according to claim 3, further comprising:
   determining the density of the gas phase of the two-phase medium by measuring the temperature of the two-phase medium and measuring the pressure at the outflow side of the Coriolis mass flowmeter; and
   determining the density of the gas phase of the two-phase medium based on the measured temperature of the two-phase medium and based on the measured pressure at the outflow side of the Coriolis mass flowmeter.

5. The method according to claim 1, further comprising:
   using the viscosity of the single-phase medium as a further input variable of the correction calculation; and
   determining the viscosity of the single-phase medium from a temperature-dependent viscosity curve using the temperature of the two-phase medium.

6. The method according to claim 1, further comprising:
   using the differential pressure over the inflow side and the outflow side of the Coriolis mass flowmeter as a further input variable of the correction calculation;
   storing at least a portion of the differential pressures determined in the two-phase measurement interval; and
   storing a differential pressure for each two-phase flow measurement value.

7. The method according to claim 1, further comprising:
implementing the correction calculation with an approximate solution method in which the two-phase flow measurement values and the at least one state variable of the single-phase medium determined in the single-phase measurement interval as at least indirect input variables, are approximately mapped onto the corrected two-phase flow measurement values.

8. The method according to claim 7, wherein the correction calculation is implemented by an artificial neural network having:
an input layer with at least two input neurons for supply of the two-phase flow measurement values to be corrected and for supply of the state variable of the single-phase medium determined in the single-phase measurement interval or a variable derived therefrom as at least indirect input variables;
an output layer with an output neuron for output of the corrected two-phase flow measurement values; and
at least one intermediate layer with at least two neurons, wherein each input neuron is connected to each neuron of the intermediate layer via directed and weighted signal paths and wherein each neuron of the intermediate layer is connected to the output neuron of the output layer via a directed and weighted signal path.

9. The method according to claim 8, wherein the artificial neural network includes:
at least four input neurons in the input layer for supply of the two-phase flow measurement values to be corrected, the gas-volume fraction of the two-phase medium, the viscosity of the single-phase medium and the differential pressure via the inflow side and the outflow side of the Coriolis mass flowmeter;
an output neuron for output of the corrected two-phase flow measurement values; and
four neurons in an intermediate layer, wherein each input neuron is connected to each neuron of the intermediate layer via directed and weighted signal paths and wherein each neuron of the intermediate layer is connected to the output neuron of the output layer via a directed and weighted signal path.

10. The method according to claim 8, wherein the artificial neural network is trained with a training data set; and
wherein the training data set is collected for one design of a Coriolis mass flowmeter and the training data set includes value tuples from the used input variables of the artificial neural network and the output variable of the artificial neural network.

11. The method according to claim 10, wherein a training data set is collected for each two-phase medium and a separate artificial neural network is trained for each two-phase medium.

12. The method according to claim 1, further comprising:
after the completed measurement operation, determining the single-phase measurement interval and the two-phase measurement interval from the two-phase flow measurement values or other recorded data; and
carrying out the correction calculation.

13. The method according to claim 1, wherein the two-phase flow measurement values determined and stored in the two-phase measurement interval and the at least one state variable of the single-phase medium determined in the single-phase measurement interval are input as indirect variables of the correction calculation.

14. The method according to claim 1, wherein the two-phase flow measurement values determined and stored in the two-phase measurement interval and the at least one state variable of the single-phase medium determined in the single-phase measurement interval are input as direct variables of the correction calculation.

15. The method according to claim 1, wherein the step of outputting corrected two-phase flow measurement values from the correction calculation involves outputting the corrected two-phase flow measurement values as individual values.

16. The method according to claim 1, wherein the step of outputting corrected two-phase flow measurement values from the correction calculation involves outputting the corrected two-phase flow measurement values as part of a cumulative flow measurement value.

17. A Coriolis mass flowmeter, comprising:
at least one measuring tube through which a medium can flow;
at least one oscillation generator;
at least two oscillation sensors; and
at least one control and evaluation unit;
wherein the control and evaluation unit is designed such that, in the presence of a two-phase flow of a two-phase medium having a gas phase in a two-phase measurement interval and a presence of a single-phase flow of a single-phase medium not having a gas phase in a single-phase measurement interval occurring after the two-phase measurement interval, the starting time of the two-phase measurement interval is detected at the onset of the two-phase flow;
wherein the end time of the two-phase measurement interval is detected at the end of the presence of the two-phase flow;
wherein, in the two-phase measurement interval, two-phase flow measurement values of the two-phase flow are determined and stored;
wherein, in the single-phase measurement interval, at least one state variable of the single-phase medium is determined;
wherein the two-phase flow measurement values determined and stored in the two-phase measurement interval and the at least one state variable of the single-phase medium determined in the single-phase measurement interval are input as variables of a correction calculation; and
wherein corrected two-phase flow measurement values are output from the correlation calculation.

18. The Coriolis mass flowmeter according to claim 17, wherein the control and evaluation unit is designed such that:
at least the density of the single-phase medium is determined as state variable of the single-phase medium; and
at least the density of the single-phase medium is used as at least an indirect input variable of the correction calculation.

19. The Coriolis mass flowmeter according to claim 17, wherein the start time of the two-phase measurement interval is detected at the onset of the two-phase flow and/or that the end time of the two-phase measurement interval is detected at the end of the presence of the two-phase flow by evaluating the level of the excitation signal of the oscillation generator and/or by evaluating the level of the sensor signal of the oscillation sensor;
wherein the start time of the two-phase measurement interval is detected when a limit height of the excitation signal and/or of the sensor signal is exceeded; and wherein the end time of the two-phase measurement interval is detected when the excitation signal and/or the sensor signal falls below a limit height.

\* \* \* \* \*